(12) United States Patent
Thomsen et al.

(10) Patent No.: US 7,980,354 B2
(45) Date of Patent: Jul. 19, 2011

(54) HYDRAULIC STEERING

(75) Inventors: Svend Thomsen, Nordborg (DK); Bendt Porskrog, Nordborg (DK); Niels Bjarne Hansen, Aabenraa (DK); Tom Rudolph, Sydals (DK)

(73) Assignee: Sauer-Danfoss Aps, Nordborg (DK)

( * ) Notice: Subject to any disclaimer, the term of this patent is extended or adjusted under 35 U.S.C. 154(b) by 123 days.

(21) Appl. No.: 12/264,518

(22) Filed: Nov. 4, 2008

(65) Prior Publication Data

US 2009/0114469 A1 May 7, 2009

(30) Foreign Application Priority Data

Nov. 5, 2007 (DE) .......................... 10 2007 053 024

(51) Int. Cl.
*B62D 5/06* (2006.01)
*B62D 5/08* (2006.01)
(52) U.S. Cl. .......................... 180/441; 180/403; 180/417
(58) Field of Classification Search .................. 180/441, 180/403, 417
See application file for complete search history.

(56) References Cited

U.S. PATENT DOCUMENTS

| | | | |
|---|---|---|---|
| 2,270,335 A | 1/1942 | Parkinson | |
| 3,052,435 A | 9/1962 | Roller | |
| 4,106,881 A | 8/1978 | Stannow et al. | |
| 4,118,153 A | 10/1978 | Stannow et al. | |
| 4,406,590 A | 9/1983 | Kessler | |
| 4,427,349 A | 1/1984 | Elson | |
| 4,984,971 A | 1/1991 | Bergeron | |
| 5,803,717 A | 9/1998 | Iversen et al. | |
| 6,004,113 A | 12/1999 | Vay | |
| 6,095,768 A | 8/2000 | Bianchi | |
| 6,405,824 B1* | 6/2002 | Sørensen et al. | 180/442 |
| 6,408,977 B1 | 6/2002 | Obertrifter et al. | |
| 6,485,271 B1 | 11/2002 | Tack | |
| 6,581,717 B1* | 6/2003 | Sørensen et al. | 180/401 |
| 6,896,092 B2* | 5/2005 | Stall | 180/403 |
| 7,185,730 B2* | 3/2007 | Schmidt et al. | 180/403 |
| 7,686,124 B2* | 3/2010 | Hublart et al. | 180/403 |
| 2004/0182636 A1* | 9/2004 | Pedersen et al. | 180/403 |
| 2006/0131098 A1* | 6/2006 | Schmidt et al. | 180/417 |
| 2007/0221437 A1 | 9/2007 | Kryhlmand et al. | |
| 2008/0116001 A1* | 5/2008 | Graeve et al. | 180/441 |

FOREIGN PATENT DOCUMENTS

| | | |
|---|---|---|
| DE | 2617388 A1 | 10/1977 |
| DE | 4411191 A1 | 10/1995 |
| DE | 102004021531 A1 | 9/2005 |
| DE | 102006010695 A1 | 9/2007 |
| GB | 2341159 A | 3/2000 |
| WO | 8605455 A1 | 9/1986 |

* cited by examiner

*Primary Examiner* — Paul N Dickson
*Assistant Examiner* — Marlon A Arce
(74) *Attorney, Agent, or Firm* — McCormick, Paulding & Huber LLP

(57) ABSTRACT

The invention concerns a hydraulic steering (1) with a supply connection arrangement (P, T), a steering motor (2) and a steering unit (3) between the supply connection arrangement and the steering motor (2), the steering unit (3) having a directional section (4) and a measuring section (5), a steering valve (9) being arranged in parallel to the steering unit (3). With such a steering, it is endeavored to achieve the best possible safety. For this purpose, it is ensured that for each steering direction the directional section (4) comprises a first outlet (A1L, A1R), which is connected to the steering motor (2) by means of a first pipe (23, 24), and a second outlet (A2L, A2R), which is connected to the steering motor (2) by means of a second pipe (25, 26), the first outlet (A1L, A1R) being, in the neutral position of the directional section (4), connected to the measuring section (5), and the first pipe (23, 24) being interruptible by means of a valve arrangement (27, 27*a*).

18 Claims, 2 Drawing Sheets

HYDRAULIC STEERING

CROSS REFERENCE TO RELATED APPLICATION

Applicant hereby claims foreign priority benefits under U.S.C. §119 from German Patent Application No. 10 2007 053 024.4 filed on Nov. 5, 2007, the contents of which are incorporated by reference herein.

FIELD OF THE INVENTION

The invention concerns a hydraulic steering with a supply connection arrangement, a steering motor and a steering unit between the supply connection arrangement and the steering motor, the steering unit having a directional section and a measuring section, a steering valve being arranged in parallel to the steering unit.

BACKGROUND OF THE INVENTION

Such a hydraulic steering is, for example, known from DE 10 2006 010 695 A1. A vehicle equipped with such a steering can either be steered via the steering unit, the driver then usually activating a steering member, for example a steering handwheel, or via the steering valve. When the driver steers the vehicle by means of the steering unit, in many cases a so-called reaction behaviour is desired, that is, the driver must feel through the steering handwheel that forces are acting upon the steering motor. However, this reaction behaviour causes problems, if the vehicle is steered by means of the steering valve. Thus, in the state of the art a reaction suppression arrangement has been proposed, in which a valve is arranged in one or both pipes between the steering unit and the steering motor, said valve(s) being able to interrupt or release the pipe(s).

In some cases, it happens that a valve gets stuck, that is, in spite of an activation signal the valve does not change its position as specified by the activation signal. In the state of the art this causes problems, if a valve of the reaction suppression arrangement gets stuck. In this case, the pipe between the steering unit and the steering motor is blocked, so that the driver can no longer steer the vehicle via the steering unit.

SUMMARY OF THE INVENTION

The invention is based on the task of providing a steering with the highest possible degree of safety.

With a hydraulic steering as mentioned in the introduction, this task is solved in that for each steering direction the directional section comprises a first outlet, which is connected to the steering motor by means of a first pipe, and a second outlet, which is connected to the steering motor by means of a second pipe, the first outlet being, in the neutral position of the directional section, connected to the measuring section, and the first pipe being interruptible by means of a valve arrangement.

With this embodiment, a reaction of the steering motor for the steering arrangement is not only achieved, if the directional section is activated, but also in the neutral position of the directional section. Forces acting upon the steering motor are transferred via the first pipe to the first outlet and via the directional section to the measuring motor. If, here, hydraulic pressures are changing, the driver can feel this via the steering member, for example the steering handwheel. This, however, only applies for as long as the valve arrangement has not interrupted the first pipe. When the valve arrangement interrupts the first pipe, the reaction behaviour does no longer exist. The valve arrangement then forms a reaction suppression arrangement. The vehicle can then, for example, be steered via the steering valve. If now, the valve arrangement should remain in the interruption position, for some reason, however, the vehicle should, for example in an emergency situation or during a manoeuvre, require steering via the steering unit, this is possible, because the hydraulic fluid from the measuring section reaches the measuring motor via the steering unit and the second outlet and the second pipe. Thus, the second pipe bypasses the valve arrangement, so that for such cases the actual opening behaviour of the valve arrangement is of inferior importance. A somewhat larger resistance may occur during steering, as only one of two pipes is available for supplying the hydraulic fluid from the steering unit to the steering motor. However, this is usually sufficient. If the valve arrangement is still blocking the first pipe, the fluid flowing back from the steering motor can flow back via the second pipe to the directional section and from there to the supply connection arrangement. Thus, also the low-pressure side offers an opportunity of bypassing the valve arrangement.

Preferably, the valve arrangement can be activated by a signal that activates the steering valve. This gives an automatic interruption of the first pipes, when the steering valve is used. In this case, the reaction suppression arrangement is, however, desired. The driver does not have to worry about the suppression of the reaction.

Preferably, the valve arrangement is made as a normally open valve arrangement. The valve arrangement opens the first two pipes, if no additional external forces are acting. Such an embodiment can, for example, be achieved by means of a spring that takes the valve arrangement to the opening position.

Preferably, the valve arrangement is hydraulically activated. Thus, no additional energy is required for activating the valve arrangement. Pressurised hydraulic fluid is usually available in a hydraulic steering anyway. The pressure required for activating the valve arrangement is merely a control pressure, so that here relatively small pressures can be sufficient.

In a preferred embodiment it is provided that during activation the two outlets of the directional section are connected to the inlet that is connected to the measuring section. Fluid that flows through the measuring section, for example when turning the steering handwheel, can then reach the steering motor in two ways, namely on the one hand via the first outlet and the first pipe and on the other hand via the second outlet and the second pipe. The hydraulic fluid flowing back from the motor can then flow back via the first and the second outlet of the other direction. If the valve arrangement has opened the first pipe or the first pipes, the hydraulic fluid can flow from the steering unit to the steering motor via two parallel pipes. If the valve arrangement has interrupted the first pipe or the first pipes, the second pipe will still be available for the hydraulic fluid. Otherwise, practically nothing is changed in the steering behaviour, as exactly the amount of fluid supplied by the measuring section will also reach the steering motor. Only, during undisturbed operation it will be supplied to the steering motor via two pipes and during disturbed operation it will be supplied via one pipe.

Preferably, the steering valve is connectable to the steering motor via the valve arrangement. This means that the valve arrangement does not only interrupt the first pipes, but, during the interruption, it also creates a connection between the steering valve and one first pipe. This also applies in the opposite case: If the valve arrangement connects the first pipes, it interrupts the connection between the steering valve and the steering motor. If, in this case, the directional section of the steering arrangement is in the neutral position, the reaction is blocked, as no hydraulic fluid can flow from the steering motor to the measuring section via the first pipe. The pressures reported to the steering unit via the second pipe do not reach the measuring section, as, in the neutral position, the directional section interrupts a connection from the second outlets to the measuring section.

Preferably, the valve arrangement connects a load-sensing pipe to a low-pressure connection, when the first pipe is open. Thus, the valve arrangement ensures that a load-sensing system cannot build up a pressure, which could open the steering valve, when the first pipes are open and the vehicle should accordingly be steered via the steering unit.

Preferably, the valve arrangement has one first valve, which releases or interrupts the first pipe, and a second valve, which releases or interrupts a supply to the steering valve. In a manner of speaking, this provides two opportunities of taking influence on, whether the vehicle is controlled via the steering unit or via the steering valve. The risk that a serious error will occur is therefore kept small.

It is preferred that the first valve and the second valve have a common activation signal and an opposite interruption behaviour. This means that, when the first valve closes, the second valve opens, and vice versa. Thus, when activating the steering valve, the reaction behaviour can at the same time be suppressed.

Preferably, the two first pipes can be interrupted by a common valve arrangement. This simplifies the design. Further, this can ensure that the two first pipes are interrupted or opened for both directions at approximately the same time.

BRIEF DESCRIPTION OF THE DRAWINGS

In the following, the invention is described on the basis of preferred embodiments with reference to the drawings, showing.

DETAILED DESCRIPTION

Figure 1:
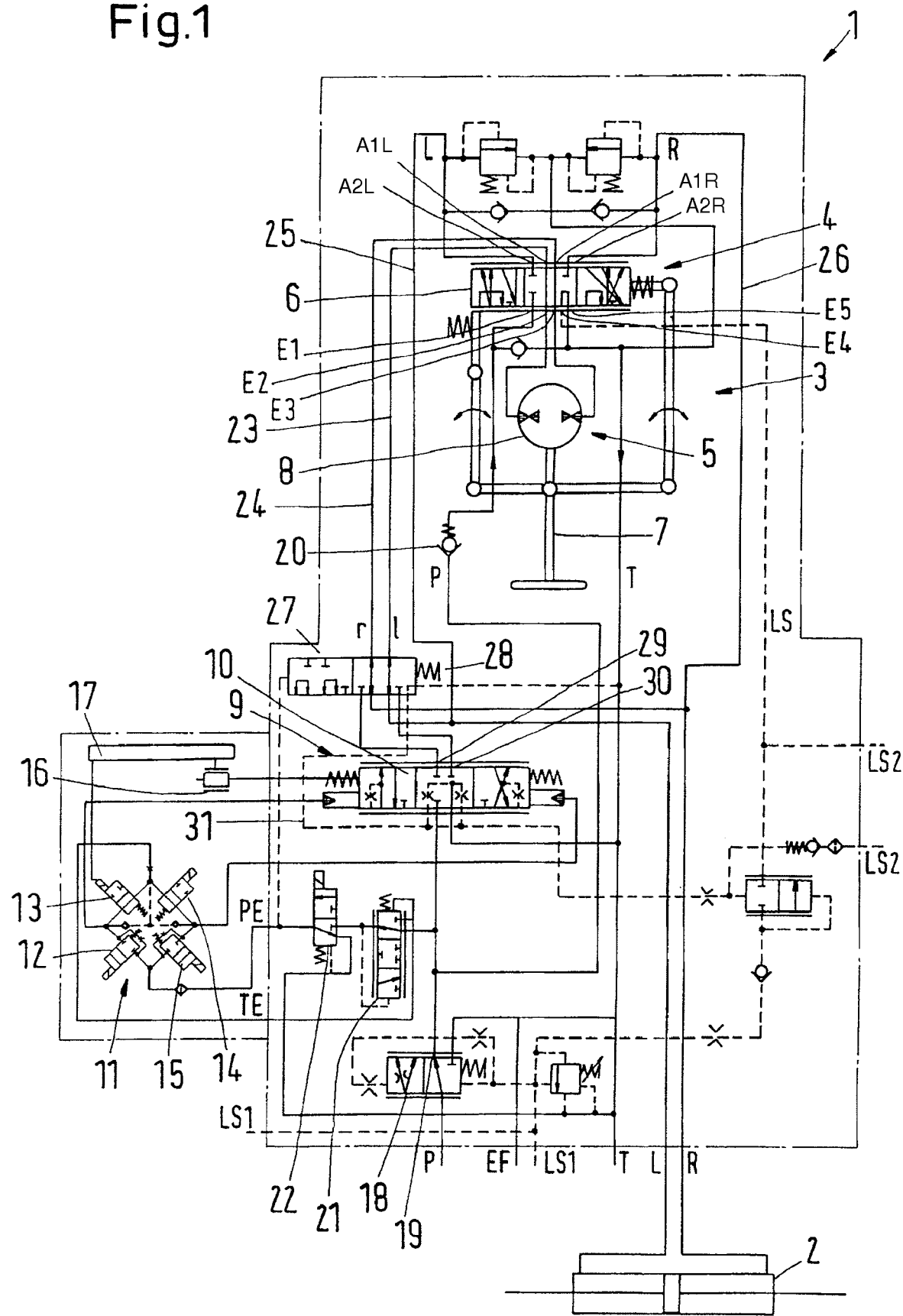
FIG. 1 is a first embodiment of a hydraulic steering.

A hydraulic steering 1 is supplied with pressurised hydraulic fluid via a supply connection arrangement. The supply connection arrangement has a high-pressure connection P and a low-pressure connection T. Additionally, also a load-sensing connection LS1 and an outlet with a low priority EF may be provided.

The steering 1 serves the purpose of steering a steering motor 2, which has two connections L, R.

The steering 1 has a steering unit 3 with a directional section 4 and a measuring section 5, which can, in a manner known per se, be formed by a measuring motor 8. Here, the steering unit 3 is a "closed-centre" unit. However, also an "open-centre" unit can be used.

The directional section 4 has a valve, here simply shown as a directional valve slide 6, which can be displaced into three different positions, namely the neutral position shown, and two directional positions displaced from the neutral position. In reality, the directional section 4 will often have two mutually rotatable valve sleeves, which are rotatably supported in a housing. One of these sleeves is connected to a steering handwheel 7. The other valve sleeve is connected to the measuring motor 8 of the measuring section 5. The principle embodiment of such a steering unit 3 is known per se.

Further, the steering 1 has a steering valve 9 with a steering valve slide 10. The steering valve slide 10 is only shown schematically. It can be displaced from the neutral position shown into two directional positions. The displacement takes place by means of hydraulic pressures, which are supplied via a hydraulic bridge circuit 11. The hydraulic bridge circuit 11 has four, for example electrically activated, valves 12-15. Depending on, which of the valves 12-15 are opening, the steering valve slide 10 is displaced to the left or to the right (in relation to the view of FIG. 1). The resulting position is reported to a control electronic 17 via a sensor 16.

The high-pressure connection P is connected to a priority valve 18, whose priority outlet 19 is connected to the steering unit 3 via a non-return valve 20. The priority outlet is also connected to an inlet of the steering valve 9. Further, the priority outlet 19 of the priority valve is connected to a pressure control valve 21, whose outlet supplies a pressure of, for example, 12 bar. Between the pressure control valve 21 and the bridge circuit 11 is arranged a stop valve 22, which does, in the switching position shown, prevent pressurised hydraulic fluid from reaching the hydraulic bridge circuit 11. The lack of a supply to the hydraulic bridge circuit 11 causes that the steering valve 9, which can be a proportional valve, cannot be activated.

The directional section 4 has five inlets E1, E2, E3, E4 and E5. Here, the term "inlet" has been chosen for reasons of simplicity. Hydraulic fluid can also flow off from the directional section via an inlet. The inlet E1 is connected to the priority outlet 19 of the priority valve. The inlets E2, E3 are connected to the measuring section 5. The inlet E4 is connected to a load-sensing pipe LS, and the inlet E5 is connected to the low-pressure connection T.

The directional section 4 has four outlets A1L, A1R, A2L, A2R. Thus, for each steering direction a first outlet A1L, A1R and a second outlet A2L, A2R is provided. The first outlets A1L, A1R are connected via a first pipe 23, 24, respectively, to the steering motor 2. The second outlets A2L, A2R are also connected via a second pipe 25, 26, respectively, to the steering motor 2. The first pipes 23, 24 can be released (position shown) or interrupted via a valve arrangement 27, when the valve arrangement 27 is switched over. Also here, the term "outlet" has been chosen for reasons of simplicity. Hydraulic fluid can also flow into the directional section via an outlet.

In the shown neutral position of the directional valve slide 6, the two first pipes 23, 24 are connected to the measuring motor 8 through the directional valve slide 6. The two second pipes 25, 26 are interrupted by the directional valve slide 6, that is, they are neither connected to the measuring section 5 nor to the supply connection arrangement. In the shown position of the valve arrangement 27, this causes that pressure changes occurring on the steering motor 2 because of external forces will result in a reaction on the steering motor 8 and thus on the steering handwheel 7. In many cases, this is desired.

When the steering unit 3 is activated, pressurised hydraulic fluid gets from the priority outlet 19 through the steering valve slide 6 to the measuring motor 8 and from there (when steering to the left) via the first outlet A1L into the first pipe 23 and via the second outlet A2L into the second pipe 25. Here, the two pipes are arranged in parallel to each other. With a steering movement in the opposite direction, the same applies for the outlets A1R, A2R and the pipes 24, 26.

Usually, the steering unit 3 is only activated to move the steered wheels of a vehicle. As soon as they have reached their position, the steering unit 3 is deactivated again. This also applies, if at that time the wheels are set in an angle to the vehicle steering axis. The directional section 4 then returns to the neutral position.

If, with a steering unit 3 in the neutral position, the vehicle shall be steered via the steering valve 9, the stop valve 22 is activated. The hydraulic bridge circuit 11 receives pressurised hydraulic fluid, so that it can displace the steering valve slide 10. As soon as the hydraulic bridge circuit 11 receives pressure, a corresponding control pressure is lead to the valve arrangement 27, which is switched to the other position against the force of a spring 28. This is the position, which is shown in the left box of the valve arrangement 27. In this position, the two first pipes 23, 24 are interrupted. In stead, two outlets 29, 30 of the steering valve 9 are connected to the two pipes 25, 26, so that the steering motor 2 is now steered via the steering valve 9.

As soon as the stop valve 22 is deactivated, the hydraulic bridge circuit 11 no longer receives a pressure. At the same time, the control pressure on the valve arrangement 27 is reduced, so that the spring 28 again sets the valve arrangement so that the two first pipes 23, 24 are open, as shown.

In this position, the valve arrangement 27 connects a load-sensing pipe 31 to the low-pressure connection T, so that a pressure cannot mistakenly build up, for example because of leakages or the like, which activates the steering valve 9 in an undesired manner.

If the vehicle is steered via the steering valve 9, the two first pipes 23, 24 are interrupted by the valve arrangement 27. The two second pipes 25, 26 are interrupted by the directional section 4. Accordingly, a reaction to the steering handwheel 7 does not take place, if external forces act upon the steering motor.

If the vehicle is steered via the steering valve 9, the hydraulic pressure supplied to the steering motor 2 by the steering valve 9 is always lower than a pressure that would origin from the steering unit 3. If, in a situation, where the vehicle is steered via the steering valve 9, the driver activates the steering handwheel 7, the steering unit 3 first supplies a somewhat higher pressure than the steering valve 9. This pressure is passed on to the steering motor 2 through one of the two pipes 25, 26, even though the two first pipes 23, 24 are interrupted. Also when the steering valve 9 is still active or blocks the valve arrangement 27, a steering of the vehicle by means of the steering unit 3 is possible.

The two first pipes 23, 24 are always controlled in common by the valve arrangement 27, that is, they are practically released or interrupted at the same time. Any further adaptation measures are not required.

The valve arrangement 27 does not only disconnect the reaction function, but generally also makes the steering 1 safer.

Figure 2:
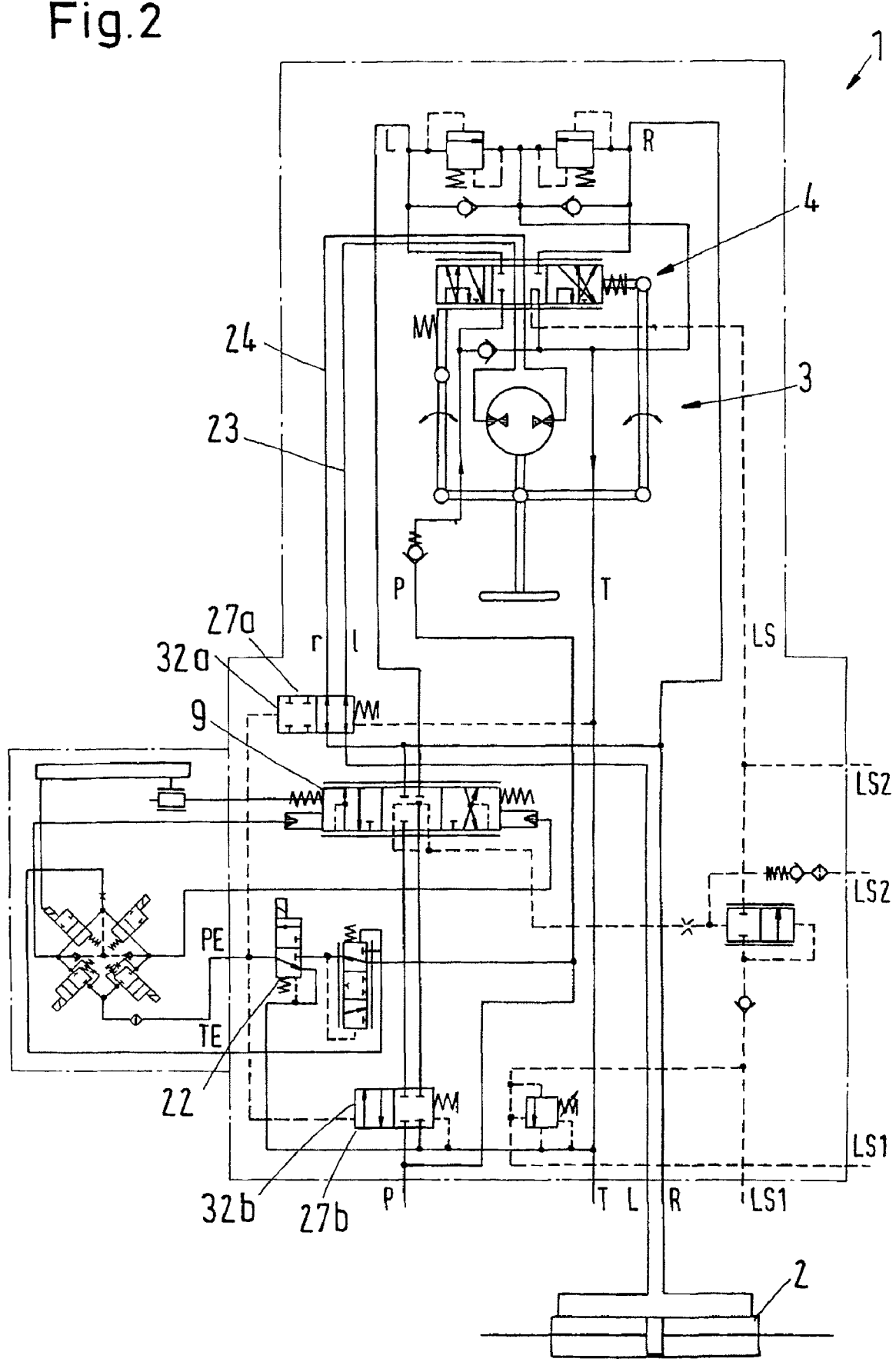
FIG. 2 is a second embodiment of a hydraulic steering.

FIG. 2 shows a modified embodiment, in which the same elements have the same reference numbers.

The embodiment of the valve arrangement 27 has been changed. The valve arrangement 27 now has two separate valves 27a and 27b. The valve 27a acts upon the first pipes 23, 24 from the directional section 4 of the steering unit 3 to the steering motor 2. The valve 27b interrupts a connection from the high-pressure connection P to the steering valve 9 and a connection from the steering valve 9 to the low-pressure connection T. Both valves 27a, 27b are activated by an activation of the stop valve 22. For this purpose, the outlet of the stop valve 22 is connected to control pressure surfaces 32a, 32b of the two valves 27a, 27b. This means that both valves 27a, 27b switch at the same time. However, the two valves 27a, 27b have different passage behaviours. In the normal position shown in FIG. 2, the valve 27a is open, that is, it releases the two pipes 23, 24, whereas the valve 27b is closed and interrupts a connection from the high-pressure connection P to the steering valve 9. After switching, the valve 27a interrupts the two first pipes 23, 24, whereas the valve 27b releases the connection from the high-pressure connection P to the steering valve 9.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A hydraulic steering with:
  a supply connection arrangement;
  a steering motor;
  a steering unit between the supply connection arrangement and the steering motor, the steering unit having a directional section and a measuring section; and
  a steering valve being arranged in parallel to the steering unit, wherein for each steering direction the directional section comprises a first outlet connected to the steering motor by means of a first pipe, and a second outlet directly connected to the steering motor at all times by means of a second pipe, the first outlet being in the neutral position of the directional section is connected to the measuring section, and the first pipe being interruptible by means of a valve arrangement.

2. The steering according to claim 1, wherein the valve arrangement is made as a normally open valve arrangement.

3. A hydraulic steering with:
  a supply connection arrangement;
  a steering motor;
  a steering unit between the supply connection arrangement and the steering motor, the steering unit having a directional section and a measuring section; and
  a steering valve being arranged in parallel to the steering unit, wherein for each steering direction the directional section comprises a first outlet connected to the steering motor by means of a first pipe, and a second outlet connected to the steering motor by means of a second pipe, the first outlet being in the neutral position of the directional section is connected to the measuring section, and the first pipe being interruptible by means of a valve arrangement;
  wherein the valve arrangement is activated by a signal that activates the steering valve.

4. The steering according to claim 1, wherein the valve arrangement is hydraulically activated.

5. The steering according to claim 1, wherein during activation the two outlets of the directional section are connected to the inlet that is connected to the measuring section.

6. A hydraulic steering comprising:
  a supply connection arrangement;
  a steering motor;
  a steering unit between the supply connection arrangement and the steering motor, the steering unit having a directional section and a measuring section; and
  a steering valve being arranged in parallel to the steering unit, wherein for each steering direction the directional section comprises a first outlet connected to the steering motor by means of a first pipe, and a second outlet connected to the steering motor by means of a second pipe, the first outlet being in the neutral position of the directional section is connected to the measuring section, and the first pipe being interruptible by means of a valve arrangement, wherein the steering valve is connectable to the steering motor via the valve arrangement.

7. A hydraulic steering comprising:
  a supply connection arrangement;
  a steering motor;

a steering unit between the supply connection arrangement and the steering motor, the steering unit having a directional section and a measuring section; and a steering valve being arranged in parallel to the steering unit, wherein for each steering direction the directional section comprises a first outlet connected to the steering motor by means of a first pipe, and a second outlet connected to the steering motor by means of a second pipe, the first outlet being in the neutral position of the directional section is connected to the measuring section, and the first pipe being interruptible by means of a valve arrangement, wherein the valve arrangement connects a load-sensing pipe to a low-pressure connection, when the first pipe is open.

8. A hydraulic steering with:
a supply connection arrangement;
a steering motor;
a steering unit between the supply connection arrangement and the steering motor, the steering unit having a directional section and a measuring section; and
a steering valve being arranged in parallel to the steering unit, wherein for each steering direction the directional section comprises a first outlet connected to the steering motor by means of a first pipe, and a second outlet connected to the steering motor by means of a second pipe, the first outlet being in the neutral position of the directional section is connected to the measuring section, and the first pipe being interruptible by means of a valve arrangement;
wherein the valve arrangement has one first valve, which releases or interrupts the first pipe, and a second valve, which releases or interrupts a supply to the steering valve.

9. The steering according to claim 8, wherein the first valve and the second valve have a common activation signal and an opposite interruption behaviour.

10. The steering according to claim 1, wherein the first pipe is interrupted by a common valve arrangement.

11. The steering according to claim 6, wherein the valve arrangement is made as a normally open valve arrangement.

12. The steering according to claim 6, wherein the valve arrangement is activated by a signal that activates the steering valve.

13. The steering according to claim 6, wherein the valve arrangement is hydraulically activated.

14. The steering according to claim 6, wherein during activation the two outlets of the directional section are connected to the inlet that is connected to the measuring section.

15. The steering according to claim 6, wherein the valve arrangement connects a load-sensing pipe to a low-pressure connection, when the first pipe is open.

16. The steering according to claim 6, wherein the valve arrangement has one first valve, which releases or interrupts the first pipe, and a second valve, which releases or interrupts a supply to the steering valve.

17. The steering according to claim 16, wherein the first valve and the second valve have a common activation signal and an opposite interruption behaviour.

18. The steering according to claim 6, wherein the first pipe is interrupted by a common valve arrangement.

* * * * *